US005835758A

United States Patent [19]
Nochur et al.

[11] Patent Number: 5,835,758
[45] Date of Patent: Nov. 10, 1998

[54] METHOD AND SYSTEM FOR RESPRESENTING AND PROCESSING PHYSICAL AND CONCEPTUAL ENTITIES

[75] Inventors: Kumar S. Nochur; Jaikumar V. Nihalani, both of Cambridge, Mass.

[73] Assignee: Vidya Technologies, Inc., Cambridge, Mass.

[21] Appl. No.: 395,866

[22] Filed: Feb. 28, 1995

[51] Int. Cl.[6] .................................................. G06F 17/30
[52] U.S. Cl. ............................................................ 395/613
[58] Field of Search ...................................... 395/600, 613

[56] References Cited

U.S. PATENT DOCUMENTS

| | | | |
|---|---|---|---|
| 4,964,063 | 10/1990 | Esch | 364/513 |
| 5,168,441 | 12/1992 | Onarheim et al. | 364/146 |
| 5,195,178 | 3/1993 | Krieger et al. | 395/157 |
| 5,202,828 | 4/1993 | Vertelney et al. | 364/419 |
| 5,301,336 | 4/1994 | Kodoshky et al. | 395/800 |
| 5,317,725 | 5/1994 | Smith et al. | 395/183.03 |
| 5,406,477 | 4/1995 | Harben | 364/578 |
| 5,412,756 | 5/1995 | Bauman et al. | 395/50 |
| 5,421,012 | 5/1995 | Khoyi et al. | 395/650 |
| 5,487,141 | 1/1996 | Cain et al. | 395/135 |
| 5,504,851 | 4/1996 | Maesano et al. | 395/157 |
| 5,517,604 | 5/1996 | Wolf | 395/155 |
| 5,555,201 | 9/1996 | Dangelo et al. | 364/489 |
| 5,619,709 | 4/1997 | Caid et al. | 395/794 |

OTHER PUBLICATIONS

Thomas Malone: *What is coordination theory?*, Sloan School Working Paper #2051–88, pp. 1–29, MIT, Feb. 1988.
Douglas Engelbart and Harvey Lehtman: *Working together*, Byte, pp. 245–252, Dec. 1988.
Microsoft Corporation: *Microsoft Project for Windows*, 4 pages, 1989.
Jintae Lee: *Sibyl: a tool for managing group rationale*, CSCW Proceedings, pp. 79–92, Oct. 1990.
Dave Osborne: *How to chart your flow*, AMSTRAD, 3 pages, Dec. 1990.
Mike Falkner: *AllClear transforms plain text files into graphic flowcharts*, 1 page, PC Computing, Feb. 1991.

(List continued on next page.)

*Primary Examiner*—Wayne Amsbury

[57] ABSTRACT

A computer-based method and system is described for representing, storing, analyzing, processing, and communicating conceptual and physical entities. On a computer display screen, means are presented for users to create a palette of elements to define and describe entities and matters of interest to them. With a palette that they create, or with a previously defined palette, users create computer-based maps containing specific instances, called items, of one or more elements in the palette. Users can link items with line segments, arrows, or other connectors to show the relationships between them. Data, visual, and other attributes may also be defined for the links between items, the maps on which the items and links are defined, and case folders which index the maps and other associated computer-based documents and objects. Associations and connections can be established between a map, or the items or links on it, and other maps and other computer-based documents or objects such as spreadsheets, word processor files, graphical objects, audio objects, and video objects. Rules, heuristics, and norms may be specified for the palette elements, based on which maps may be parsed to see if they are correct, consistent, and complete with regard to the items they contain and the relationships indicated by the links between them. Queries can be made and reports can be generated based on the data and other attributes defined for the items, links, maps, and cases. Items, links, maps, cases, and other computer-based documents and objects can be shared among various users on a computer network. Details regarding actions or responses relating to items, links, maps, cases, and other computer-based documents and objects can be maintained in computer-based organizers, and computer messages can be generated to remind or alert users about their status and the actions to be taken relating to them. A particular embodiment of the present invention that is described here in detail pertains to the domain of purposeful human activities, inter alia goal-setting, problem-solving, decision-making, planning, and action-implementation in individual, group, and organizational settings.

19 Claims, 10 Drawing Sheets

OTHER PUBLICATIONS

Corporate Memory Systems: *CM/1 Product Statement*, 3 pages, undated (estimated 1993).

[no name]: *The wonders of workflow*, The Economist, 1 page, Dec. 11, 1993.

Alan Radding: *Stopping the bottlenecks with workflow analysis*, InfoWorld, 2 pages, Jan. 31, 1994.

METHOD AND SYSTEM FOR RESPRESENTING AND PROCESSING PHYSICAL AND CONCEPTUAL ENTITIES

BACKGROUND

1. Field of the Invention

This invention relates to a computer-based method and system for representing, storing, processing, and communicating various conceptual and physical entities. A particular embodiment of the present invention that is described here in detail relates to a computer-based system and method for representing, storing, processing, and communicating entities of interest in a specific domain, i.e. purposeful activities such as goal-setting, problem-solving, decision-making, planning, and action-implementation in individual, group, and organizational settings. This domain-specific embodiment of the present invention is in the area of computer-based systems and methods for improving personal and group productivity by individuals, businesses, governments, consulting firms, financial, medical and educational institutions, and other kinds of organizations.

2. Prior Art

Presently, people who want to represent and process, in a computer-based system, conceptual or physical entities of interest to them are limited to database, 4GL, and front-end development tools. While such tools make it possible to define various fields and records to describe entities and the relationships between, they do not allow the entities to be diagrammed visually in a way that shows how they are related in a sequence, hierarchy, structure, or other manner. Normative rules with regard to the attributes or relationships between various entities cannot be specified in a way that enables analysis of assemblages of such entities. Such tools do not allow communication or monitoring, over a computer-based network, of issues, topics, or situations that involve relationships between the entities of interest. The general-purpose invention that is described here overcomes these drawbacks and provides a complete system and method for representing, storing, processing, and communicating various conceptual and physical entities.

With regard to the domain-specific embodiment of the present invention described here, presently people in individual or organizational settings who are involved with goal-setting, problem-solving, decision-making, planning, and action-implementation do so in ways that are generally unstructured and individualistic. As a result, thinking, discourse, communication, and implementation are inefficient and ineffective. Piece meal solutions have been developed to improve productivity in these matters. These approaches and their deficiencies are discussed below.

Decision Support Systems (DSS) focus on quantitative data analysis, using methodologies such as decision trees, regression, and probabilistic risk analysis. They require numeric data as inputs, and various assumptions are made regarding the relationships between the variables. Executive Information Systems (EIS) compile and summarize data at various levels of detail. These systems have the disadvantage that they cannot represent or process qualitative issues that are often very important.

Project management software, Personal Information Managers (PIMs), and other such organizers focus on tasks, activities, and to-do lists. They are deficient in not providing a big picture perspective on why those projects or activities are important and in not providing any framework for identifying, describing, or dealing with goals, problems, or decisions.

Flowcharting and other diagramming tools have visual elements, i.e. shapes and lines, that can show connections between various elements. However the shapes do not carry labels or other descriptors, nor do the tools offer any syntax that can create a consistent visual language. Further, they do not allow specific attributes to be defined for various shapes. As a result, the visual elements cannot be analyzed or queried, and useful reports cannot be generated.

Modeling and simulation tools require numeric data for their variables, based on which they can simulate the functioning of the system represented. Such products can be used only if situations are amenable to mathematical modeling and numeric data are available to feed the models.

Problem solving tools, such as cause-effect diagrams, provide visual elements that describe problems and the causes leading to them. Such approaches do not deal with other related issues such as goals, decisions, and implementation of solutions.

Knowledge based systems require formal or semi-formal representations of a specific domain area, such as process control or investment analysis. While they enable detailed representation of the chosen field, they are narrowly focused. Also, they generally do not take into account important related matters such as problem-solving, planning, or implementation of the decisions that they help to make.

Meeting facilitation tools and computer conferencing tools help to surface issues, often anonymously, and communicate them to concerned individuals for polling or voting. Such systems are text-based and linear. While they are useful for gathering and sharing information, they lack the framework to show connections and relations in a useful format and the mechanisms needed to communicate, implement, and monitor the action steps that ensue from meetings and discussions. Discussion databases are also subject to similar shortcomings.

Workflow products focus attention on streamlining and automating repetitive processes and procedures. They help to break down a well-defined process, such as issuing an insurance policy, into its component steps and to route information and action to the people involved with various stages for their inputs, approvals, decisions, or actions. Such products do not provide support for dealing with non-routine issues or to deal with cognitive or conceptual processes.

Semantic hypertext systems have very limited analysis or reporting capability because they do not capture important data attributes relating to the items they represent. E-mail products and networked databases do not have a structured language or frameworks for clarifying issues or showing how they are interconnected.

In addition to the specific deficiencies pointed out above, all the presently available approaches identified above have the following general disadvantages: a) none of them allows users to create a computer-based system for defining entities of interest to them in a way that makes it easy to represent, store, connect, process, and communicate assemblages of such entities; b) they do not allow parsing of computer-based documents, comprised of assemblages of the entities of interest, to show whether they are complete, correct, or consistent with reference to the syntax, semantics, and data attributes of the elements used for representation; c) with regard to the domain-specific embodiment of the present invention described here, they cater to narrow areas instead of the whole spectrum of issues involved in goal-setting, problem-solving, decision-making, planning, and action-implementation; d) with regard to the domain-specific embodiment of the present invention described here in detail, they do not facilitate the process of communicating views and coordinating purposeful tasks or activities over a network of computers. e) with regard to the domain-specific embodiment of the present invention described, they are mostly analytical, or they enable information surfacing and sharing, without any facilities to support delegation, action, and the monitoring of results vis a vis original goals and expectations. Hence, all presently available methodologies—both of a general nature, and those in the domain of the specific embodiment of the present invention described here in detail—are incomplete and inadequate. They do not provide a comprehensive, integrated framework for dealing with all the key elements and aspects involved in the contexts to which they cater.

SUMMARY

It is an object of the present invention to provide a comprehensive computer-based system and method for representing, defining, storing, linking, processing, analyzing, communicating, and implementing physical and conceptual elements or entities involved in various domains. On a computer display screen, means are presented for users to create a set of elements to define and describe entities and matters of interest to them. Each element comprises a visual or other representation of it on a computer screen, various main and auxiliary labels for defining or describing the element, and means for associating descriptive text and other textual, numerical, alphanumeric, graphical, audio, video, visual, and other attributes with the element. A generator set for creating instances of such elements is called a palette in the present invention. Once a palette, specific to the elements of the domain of interest, has been created, users may define various rules, norms, and other details about how the elements of the set relate and interact with each other.

With a palette that they create, or with a previously defined palette, users create on a computer document, called a map in the present invention, specific instances, called items in the present invention, of one or more elements in the palette. Maps are stored and retrieved from computer-based storage devices. An item on a map typically comprises a visual or other representation of an element along with text and other attributes appropriate for its element category. Users can connect multiple items, if appropriate, with line segments, arrows, or other connectors to show the relationships between the items. A connection between two items is referred to as a link in the present invention. Links may also be labeled in useful ways. A set of maps, along with other computer-based documents and objects associated with the maps, or associated with the items on the maps, may be indexed in a computer-based organizer, called a case in the present invention, for selection and retrieval. Data, visual, and other attributes may also be defined for the links between items, the maps on which the items and links are defined, and the cases which index the maps and other associated computer-based documents and objects. Associations and connections can be established between a map, or the items or links on it, and other maps and other computer-based documents or objects such as spreadsheets, word processor files, graphical objects, audio objects, and video objects.

Rules, heuristics, and norms may be specified in the present invention for the palette elements individually and for assemblages of them collectively. Based on such rules, heuristics, and norms, maps may be parsed to see if they are correct, consistent, and complete with regard to the items they contain and the relationships indicated by the links between them. Queries can be made and reports can be generated based on the data and other attributes defined for the items, links, maps, and cases. Items, links, maps, cases, and other computer-based documents and objects can be shared among various users on a computer network. Users can send messages to each other over the network, along with attachments of or references to items, links, maps, cases, and other computer-based documents and objects of interest.

Users can give access to others to edit or annotate items, links, maps, cases, and other computer-based documents and objects. They can create and share instructions, templates, and guidelines relating to the items, the assemblages and links between the items, the maps that contain the items, and the cases that index the maps and other computer-based documents and objects. Details regarding actions or responses relating to items, links, maps, cases, and other computer-based documents and objects can be maintained in computer-based organizers, and computer messages can be generated to remind or alert users about their status and the actions to be taken relating to them.

The domain-specific embodiment of the present invention that is described here provides a palette, on a computer display screen, which contains a set of elements that represent issues that arise in the context of purposeful human activities, inter alia goal-setting, problem-solving, decision-making, planning, and action-implementation in individual, group, and organizational settings. This embodiment of the invention enables users to define, clarify, store, process, communicate, delegate, and monitor various matters relating to purposeful human activities. It improves on the piece meal approaches discussed above by integrating and enhancing the most important elements and functionalities that they separately provide, and by providing unique new utility and benefits.

DETAILED DESCRIPTION

A general domain-independent embodiment of the present invention is a system for generating applications that are customized to meet the needs of users. This embodiment enables users to create applications that are specific to the domain of interest to them. As an example, if users are interested in hospital management, the domain of interest might include elements such as patients, doctors, and hospitals. As another example, if the domain of interest is education in a university setting, elements of interest to users in that domain would include students, courses, faculty, and classrooms. An application created by a general-purpose embodiment of the present invention will have one or more palettes, each palette having a set of one or more elements of relevance to the user's domain of interest. Each element is represented by its symbol and indicia and has associated with it various data and other attributes to be represented, stored, processed, and communicated over a computer-based system.

Figure 1A:
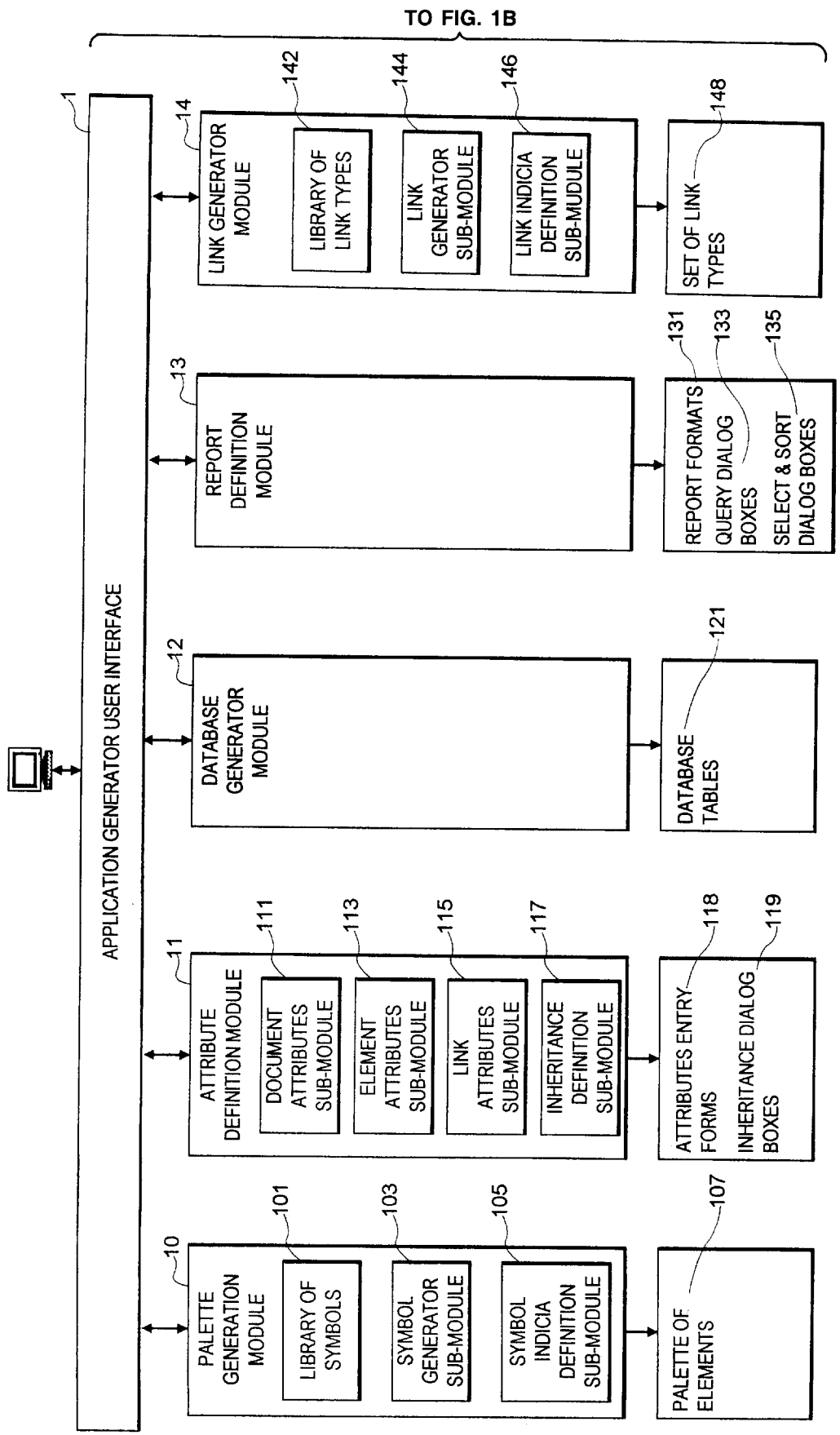
FIGS. 1A and 1B comprise a block diagram of the main modules that comprise one domain-independent general-purpose embodiment of the present invention.
Figure 1B:
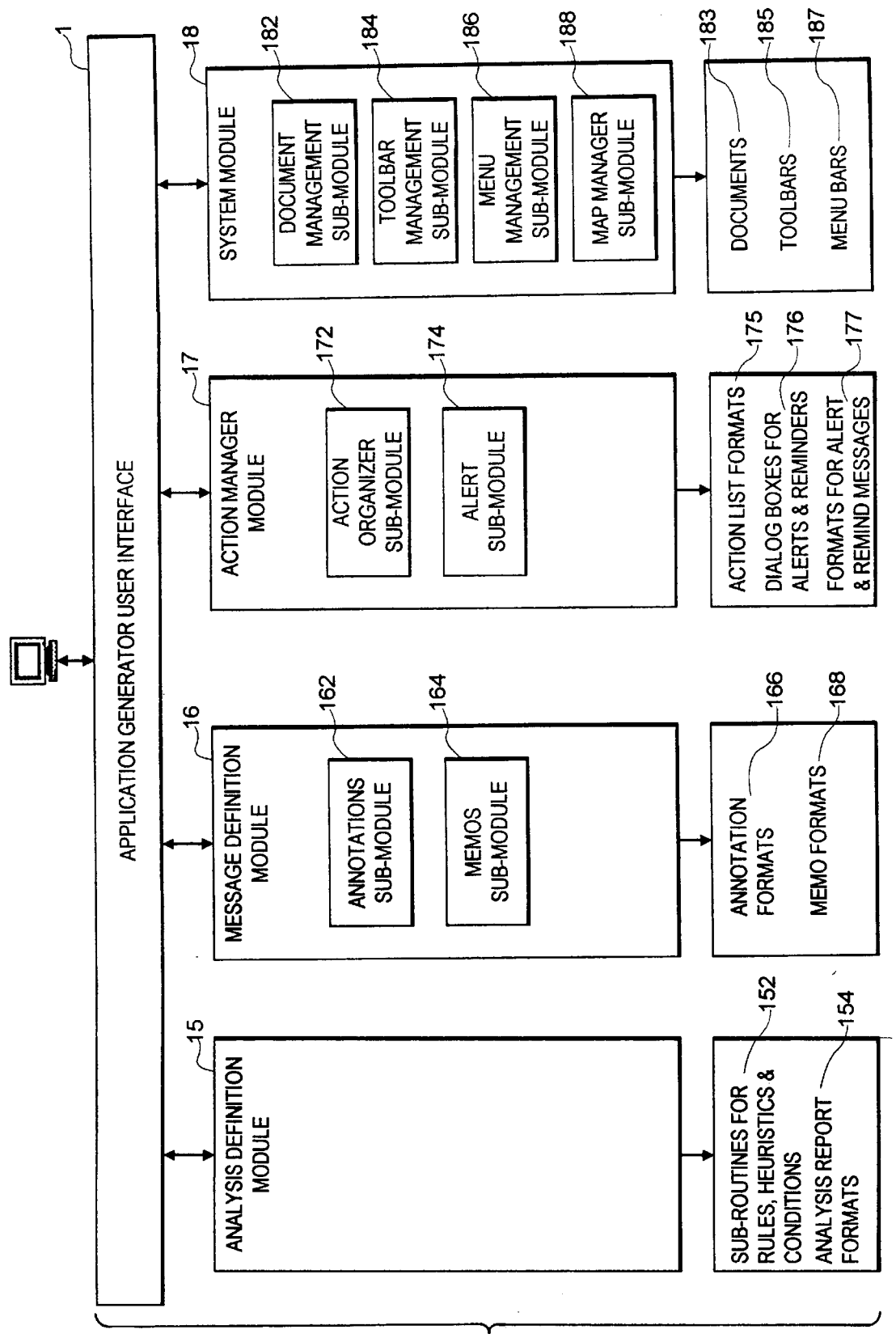

FIG. 1 is block diagram of the modules of the general-purpose embodiment of the present invention. A palette generation module 10 presents the user with a library of pre-built symbols 101. The user can select from this library of symbols 101, and also create new symbols by invoking a symbol generator sub-module 103. Indicia to label each selected or created symbol are specified in symbol indicia definition sub-module 105 to create a customized palette of elements 107 relating to the domain of interest. Once a palette 107 has been generated, data and other attributes for the elements in it are defined in attribute definition module 11.

Attribute definition module 11 comprises a document attributes sub-module 111, an element attributes sub-module 113, a link attributes sub-module 115, and an inheritance definition sub-module 117. Document attributes sub-module 111 helps users define various attributes for computer-based documents such as maps, cases, and text documents. A map is a computer-based document that contains items, which are instances of elements from palette 107, and links, which are visual representations of the relationships between various items on a map. Case documents act as folders to index or reference maps and other computer-based documents and objects. Element attributes sub-module 113 defines the attributes of the elements in palette 107. Some attributes can be defined in common across all element categories, while other attributes may be unique to specific elements. Link attributes sub-module 115 is used to define attributes of the various types of links that can be established between items placed on the map documents. Inheritance definition sub-module 117 helps users specify the attributes that can be inherited from case folders by the maps they index, from map documents by the items they contain, and between different items. After various attributes and their inheritance conditions have been defined in its sub-modules, attribute definition module 11 generates attributes entry forms 118 and inheritance dialog boxes 119 that will be used to enter, select, or inherit attributes for items, links, maps, text documents, and case folders.

Database generator module 12 accepts attribute definitions from attribute definition module 11 and creates the database tables 121 that will actually contain the values users enter in various attribute fields.

In report definition module 13, users specify the formats 131 for various reports that they want to create, based on the attributes defined earlier for items, maps, links, cases, and text documents. This module also creates the query dialog boxes 133 users will need to define queries, and dialog boxes for selection and sorting 135 data for generating various standard and customizable reports.

Link generator module 14 is for defining the kinds of line and arrow segments that will be used to show relationships and hierarchies between various items on maps. Users are presented with a library of pre-built link types 142. The user can select from this library 142, and also create new link types by invoking a link generator sub-module 144. Indicia to label each selected or created link type are specified in link indicia definition sub-module 146 to create a customized set of link types 148 relevant to the domain of interest. Once a set of link types 148 has been generated, data and other attributes for each of the link types are defined in link attributes sub-module 115.

Analysis definition module 15 allows users to define various rules, conditions, and heuristics that will be used to check whether attributes for items on a map and the links between those items are correctly specified, whether attributes of linked items are consistent with regard to user-defined criteria, and whether maps are complete in terms of the items that are present, or not present, on them. This module generates sub-routines 152 to analyze maps with regard to the items and links in them for correctness, consistency, and completeness, and report formats 154 for the results of such analyses.

Message definition module 16 comprises annotations sub-module 162 and memos sub-module 164. Annotations sub-module 162 allows users to create formats 166 for annotations that can be attached to items, links, maps, cases, and text. Memos sub-module 164 allows users to specify formats 168 for memos and to generate action or response categories relating to items, maps, text documents, and case folders that are attached to memos and communicated over a computer network to other users.

Action manager module 17 comprises action organizer sub-module 172 and alert sub-module 174. Formats 175 for an organizer to list actions related to items, maps, cases, and text documents, or other externally defined actions, is defined in organizer sub-module 172. Alert sub-module 174 allows users to define formats 177 and dialog boxes 176 for reminders and alert messages that will be triggered based on conditions such as: pre-defined times and dates; attributes, or changes in attributes, of items, links, maps, cases, or text documents; comparisons between attributes of one item at different times; comparisons between attributes of different items at a particular time; and system related events.

System module 18 comprises: document management sub-module 182 which creates documents 183 such as maps, cases, and text documents; toolbar management sub-module 184 which generates tool bars 185; menu bar management sub-module 186 which generates menu bars 187; and map manager sub-module 188 which enables items to be placed and linked on maps and to be connected to other maps and other computer-based documents and objects.

When the outputs of user inputs into modules 10 through 18 of FIG. 1 are combined and integrated, an application is generated which is a computer-based system and method for representing, defining, storing, linking, processing, analyzing, communicating, and implementing physical and conceptual entities that are specific to the domain of interest to the users. Such a specific application is now described below.

Figure 2:
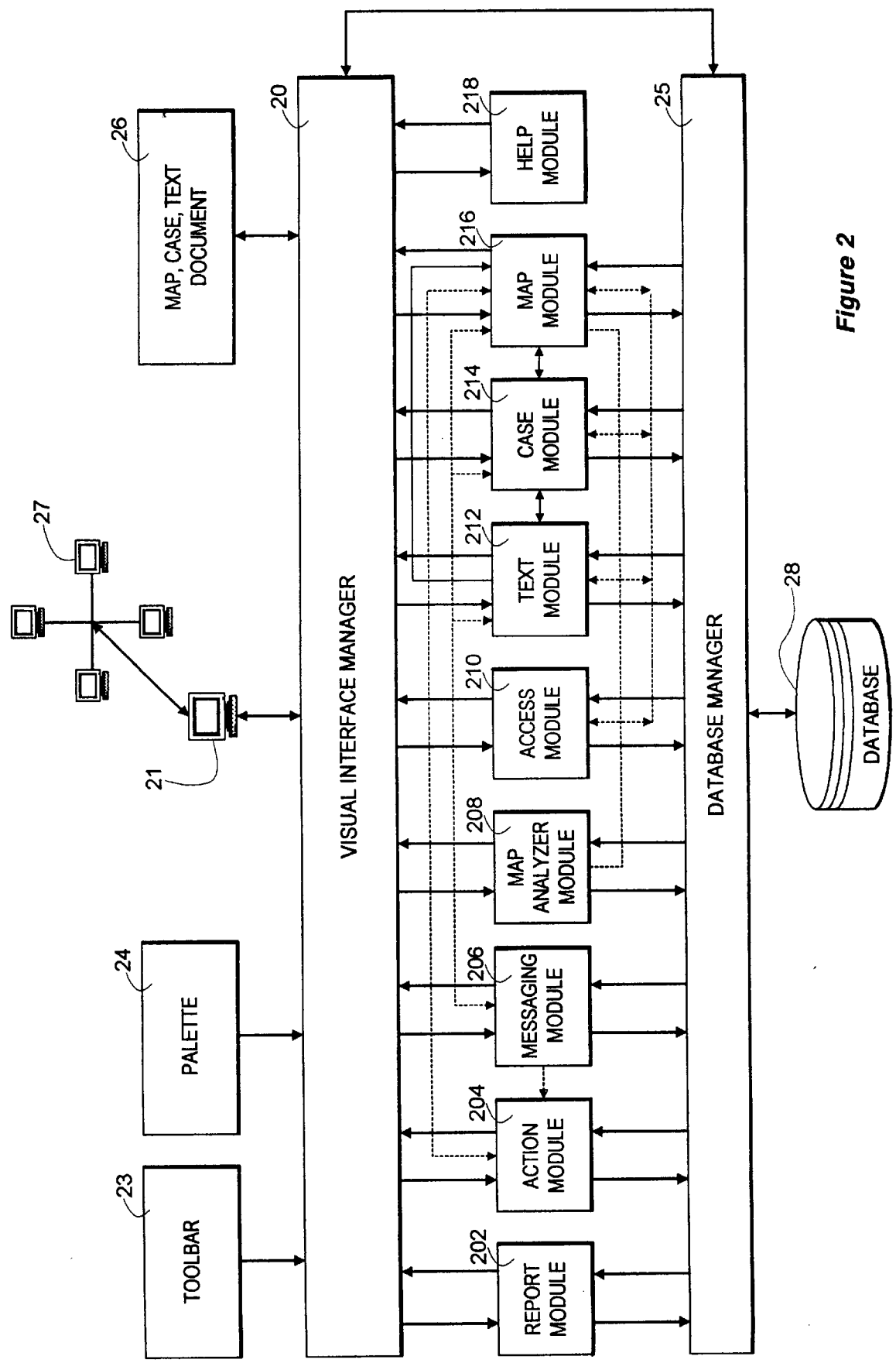
FIG. 2 is a block diagram of the main modules that comprise one particular embodiment of the present invention.

The particular embodiment of the invention described herein consists of the following modules, as shown in FIG. 2: a visual interface manager 20, a database manager 25, a database 28, a report module 202, an action module 204, a messaging module 206, an analyzer module 208, an access module 210, a text module 212, a case module 214, a map module 216, and a help module 218.

The visual interface manager 20 is the main interface which interacts with the user. It interfaces with the users through user inputs which can be via devices such as a keyboard, or a computer mouse. Visual interface manager 20 interacts with all the main modules and is directly accessible from all of them, as shown in FIG. 2, to enable the user to create, store, retrieve and transmit items, maps, cases, text documents, and other computer-based documents and objects. Visual interface manager 20 is the main control center for receiving system messages and forwarding them to the other modules.

Figure 3:
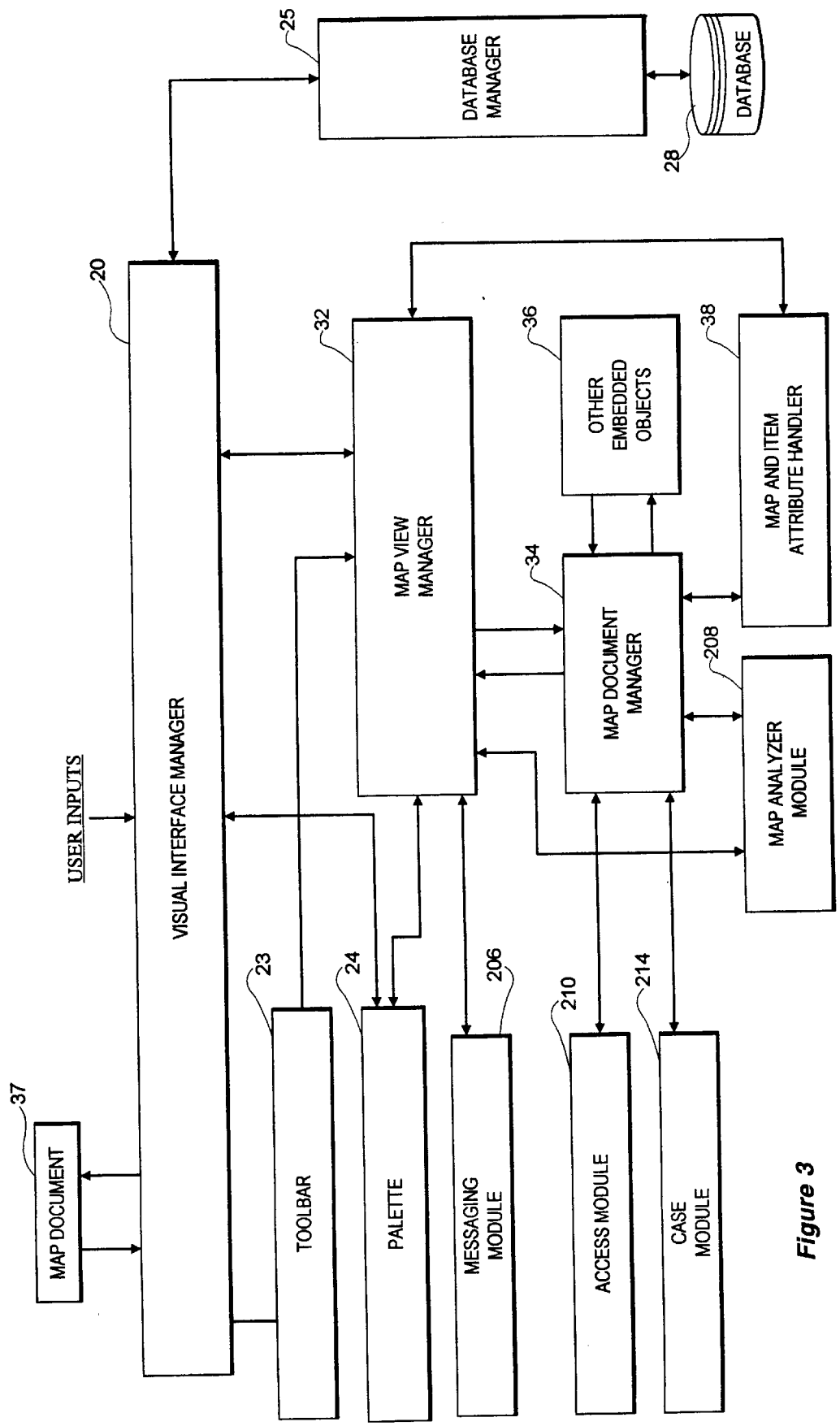
FIG. 3 is a block diagram of the case module in one particular embodiment of the present invention.

When a map document 37, as shown in FIG. 3 is opened or created, visual interface manager 20 displays palette 24 on the computer display screen. Visual interface manager 20 also creates an instance of map document 37 and passes control to map view manager 32. If an existing map is being opened, items on the map are loaded by map document manager 34. Map document 37 directs each item it contains to give its positional coordinates and other parameters, load the item's attributes, and requests map view manager 32 to display all items on the map.

When a user selects an element from palette 24, a message is conveyed to visual interface manager 20 about the element selected. Visual interface manager 20 sends a message to map view manager 32 which, in turn, sends a message to Map document manager 34 to create a virtual image of the symbol for the selected element with position, size, shape, label, and color parameters. Map document manager 34 sends a reference of the above parameters to map view manager 32 which displays it as an item on the map at the point where the user places the cursor on the map.

When a link tool from tool bar 23 is selected, visual interface manager 20 informs map view manager 32 of the type of link tool selected. Map view manager 32 switches its input context to enable connections between items to be drawn on the map by using the mouse device. The source and destination of the link are specified by the origin and end points. Map view manager 32 receives a message to draw the link, asks the link object to create its virtual image, specifies its parameters, and informs visual interface manager 20 which sends a message to the database manager 25 to update database 28 with regard to the source and destination items for the link.

The descriptive text attribute for an item can be entered or edited by selecting the text editing tool from tool bar 23 and selecting the item. When the user selects the edit tool, visual interface manager 20 receives a message about the tool selection and passes it to map view manager 32. Once the item is selected for text entry, the user can enter descriptive text and click the right button of the mouse to deselect the text edit tool. On deselection, map view manager 32 receives the deselection message and passes the text entered to the item. The item, in turn, requests the database manager 25 via visual interface manager 20 to update its text in the database 28.

Text module 212 (FIG. 2) allows the user to create and save text documents. Text from a text document can be transferred to an item on a map by first selecting the text, then selecting the relevant element from palette 24, and placing it at the desired location on the map. Visual interface manager 20 is informed of the selection made on the text document by the text module 212. When an item is selected and placed on a map, map view manager 32 (in FIG. 3) queries visual interface manager 20 for the text to be transferred and sends a message to visual interface manager 20 which in turn sends a message to database manager 25 to save the text in database 28 as part of the item's attributes.

To define other item-specific attributes of items on a map, the user invokes data entry forms by double clicking the mouse over that item, or via suitable menu commands. When map view manager 32 receives the mouse click, it identifies the item and requests database manager 25 via visual interface manager 20 to retrieve the item data from database 28. The item's data attributes are returned to map view manager 32 which passes these attributes to the map and item attribute handler 38. After the user enters data into the fields in a form, map view manager 32 receives all the data and passes them on to the item which sends a message to database manager 25 routed through visual interface manager 20 to update database 28.

The user can attach other maps, text files, or other computer-based documents, to a particular map or to the items on it. When the user specifies the documents which are to be attached to the selected map or item, map view manager 32 sends a message to visual interface manager 20 to extract identification information from those destination documents which are then saved. A visual cue is generated to show that such attachments exist for the items. When the user double clicks on the cue, map view manager 32 sends a message to the item to give the list of attached documents and then displays the list. The user can select and load any attached document from the list. Map view manager 32 sends a message to visual interface manager 20 to load the document.

Figure 4:
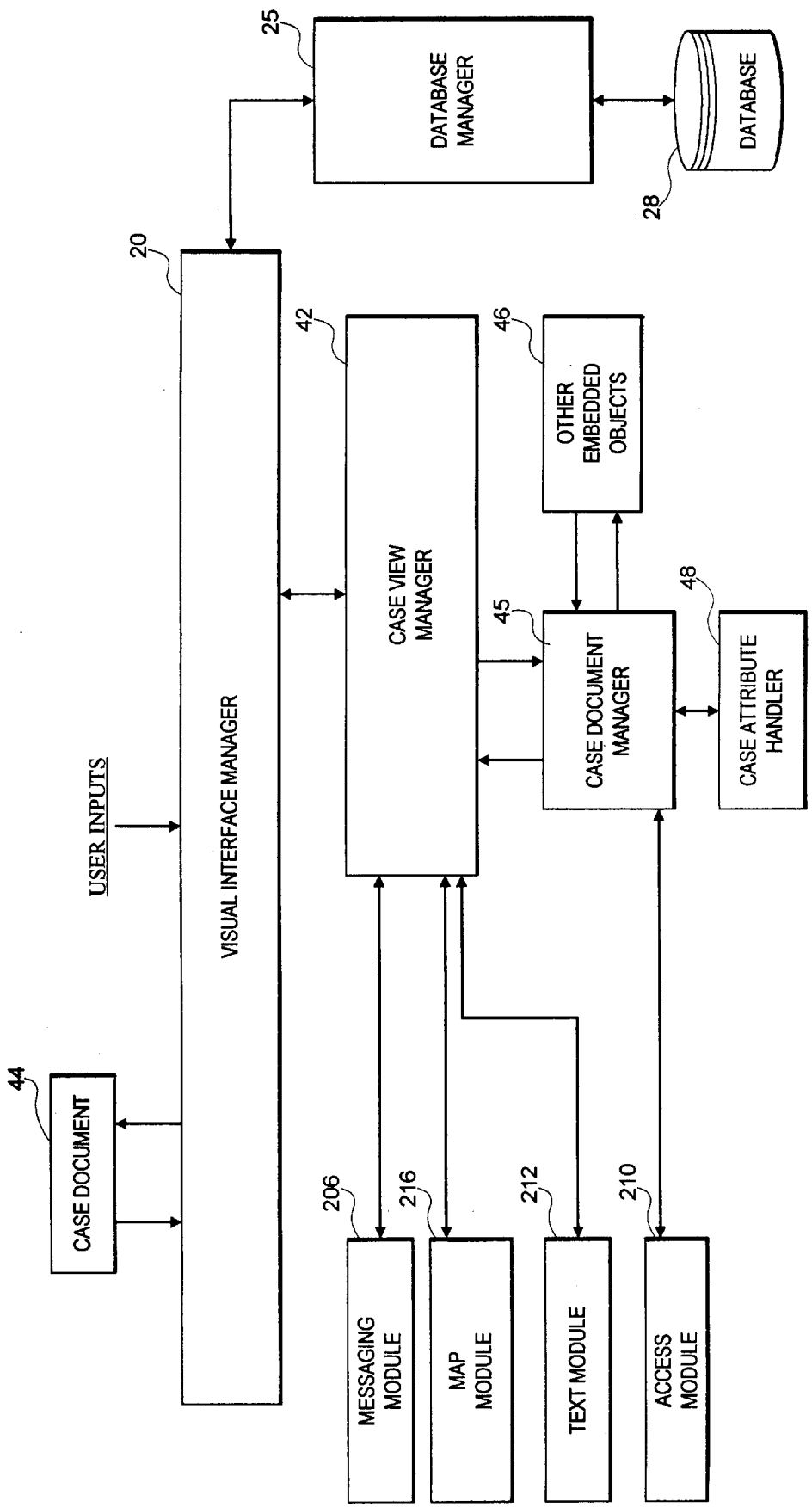
FIG. 4 is a block diagram of the map module in one particular embodiment of the present invention.

With reference to FIG. 4, a set of maps and other computer-based documents may be collected and organized into a folder, called a case document 44 in the present embodiment of the invention. When the user selects an existing case from a list of cases, or creates a new case by selecting the case tool from the tool bar, or an appropriate menu command, the visual interface manager 20 creates an instance of the case document which in turn initializes the case view. If it is an existing case, references to its documents are uploaded by case document manager 45. Control is then passed to case view manager 42. When the user selects a document to be referenced in a case, case view manager 42 sends a message to visual interface manager 20 to retrieve the identification information for the document and add it to case document 44.

Maps, cases, and other documents can also have specific attributes which can be defined by the user. The user selects the attributes command from the appropriate menu which is acknowledged by map view manager 32 or case view manager 42 of the document which puts forward an attributes entry form for entering or editing the attributes. When the user has finished entering the fields, the respective view manager takes all the information and sends a message to database manager 25 via visual interface manager 20 to update the document's attributes in database 28.

Attributes can be inherited from a case by the documents referenced by it and from a map by the items it contains. When the user selects a menu command to inherit attributes from a case to its documents, map view manager 32 sends a message to visual interface manager 20 to get the case attributes. When the case attributes have been retrieved, map view manager 32 sends a message to database manager 25 to update the map attributes in database 28 with the information inherited from the case. When the user selects a command to inherit attributes from a map document to its items, map view manager 32 sends a message to visual interface manager 20 to get the map's attributes via database manager 25 and passes the attributes to the selected item. The item sends a message to database manager 25 via visual interface manager 20 to update its attributes with the inherited information.

Users can generate reports based on their requirements. When a user selects the command to generate a report, visual interface manager 20 sends a message to report module 202 to display a dialog to select details of the report such as—the sources of information to be included in the report and the fields and records to be queried. Report module 202 then defines the report, displays it to the user, and allows the user to print or save the report. When the user selects a command to load a saved report, visual interface manager 20 passes the command to report module 202 which displays all reports which have been saved. After the user selects the report module 202 to be loaded, the report loads it from secondary storage, extracts the required information, and displays it to the user.

Map analyzer module 208 is used to analyze maps for completeness, correctness, and consistency with regard to the items they contain and the links between the items based on various rules, conditions, and heuristics. Map view manager 32 retrieves information about the items and links between them from map document 37 and passes this information to map analyzer module 208. The map analyzer module 208 sends a message to database manager 25 via map view manager 32 and visual interface manager 20 with details of the map to be analyzed. Database manager 25 parses the map using the parent-child relationships between its items and the connections between them. The parsing information is passed to map analyzer module 208 which processes it on the basis of normative rules, conditions, and heuristics with regard to the item attributes, the presence or absence of other items, and the links between items. Map analyzer module 208 passes the results of the analysis to map view manager 32 for display on the screen. The user can also print the report via report module 202.

Help module 218 provides on-line guidelines and instructions relating to all aspects of usage of the present embodiment. The user can invoke such help information on the currently selected object or select help topics from a list of contents. These commands are processed by visual interface manager 20 and sent to help module 218 which displays the appropriate help screens.

The creator of a map, case, or other computer-based document can assign to other users selective access to a document—such as to read only, annotate, edit, copy, or include it in other documents. This is accomplished by access module 210 which asks the user to specify the level of access for other users and stores this information in database 28 via database manager 25. When another user attempts to load a document, his or her user identification information is checked against the document's access list. If a match is found, the appropriate level of access is used to load the document.

A user with proper access may annotate items on maps, or other documents, from others by invoking the annotate command via the tool bar or appropriate menu. An annotation handler provides a dialog for entering annotations which are passed to database manager 25 for storage in database 28. The user can also selectively assign access to annotations. When an object is annotated, an appropriate visual cue appears proximate to it, and selecting the cue leads to the list of attached annotations to which the user has been given access.

Users can communicate, over a local or wide area networked client-server or peer-to-peer environment, by means of electronic mail or memos. Memos can be defined in relation to maps, cases, items on a map, and other documents. Messaging module 206 displays a memo form and attaches the relevant source document to it automatically. The user selects the list of recipients from a list of people available in database 28. When a memo is sent, messaging module 206 sends a message to database manager 25 to save an instance of the memo, and sends a trigger to each of its recipients informing them about it. It also saves a reference to the memo in the creator's out-basket. When a recipient acknowledges a memo trigger, all the memos sent to him are received and references to each of them is saved in the recipient's in-basket. Recipients can reply or respond to memos. The user can go to the objects attached to a memo via visual interface manager 20.

The user can create a to-do list which may be freestanding or attached to actionable items on a map or other document. This is accomplished via action module 204 which handles the tasks of creating and saving to-do items, and transferring relevant to-do entries from existing items or memos via database manager 25. The user can invoke the to-do list via visual interface manager 20 which passes control to action module 204. Various parameters to generate alerts and reminders—such as dates, times and monitoring frequencies—can also be specified in action module 204. These parameters are checked against item attributes, dates attached to to-do entries, current time and date, and other variable to trigger reminders and other such messages to alert users regarding the status of various items and documents. These reminders and alerts are displayed via visual interface manager 20 and accompanied, if so specified, with audible and other signals.

The advantages and benefits of the present invention include: a) it provides a comprehensive method and system for representing and processing entities of interest in various domains; b) it can be used to build powerful applications in many different fields; c) it improves on the piece meal approaches of other products that are currently available but which do not integrate various features that are useful; and d) it enables users who are not programmers or otherwise very sophisticated about computer usage to build useful applications to meet their needs.

The advantages and benefits of the particular embodiment of the invention, in the domain of purposeful human activities, described here include: a) It provides a concise, flexible, and simple visual and verbal method and system for precise thinking, communication, implementation, and follow-up action; b) It creates an integrated environment for dealing with all key issues that are relevant in the context of its use; c) It provides means for delegating, tracking, monitoring, and updating of issues, actions, and results over a distributed computer network; d) It delivers in a just-in-time fashion tools, guidance, and process know-how to improve goal-setting, problem-solving, decision-making, planning, analysis, and other such activities; e) It promotes improved comprehension and clarity about complex situations and issues; f) It fosters a sense of context and connectivity by showing how details fit in the "big picture" perspective; g) It captures data attributes that enable analysis, report generation, and other kinds of processing; h) It provides feedback to users about the correctness and completeness of the documents they create based on an internal system of syntax, semantics, and data attributes. As a result of all the above features, advantages, and benefits, the present invention enhances clarity, communication, coordination, and collaboration among its users, thereby leading to greater productivity, effectiveness, and quality in their efforts and results.

The foregoing advantages are some examples of the advantages provided by the particular embodiment of the present invention, and are not intended to be exhaustive. Specific examples of the implementation of the invention are shown in the drawings and are discussed herein. Those examples are not intended to limit the invention. Other objects and advantages of the invention will become apparent from a consideration of the ensuing descriptions and accompanying drawings.

DETAILED DESCRIPTION—OPERATION OF A PARTICULAR EMBODIMENT

Figure 6:
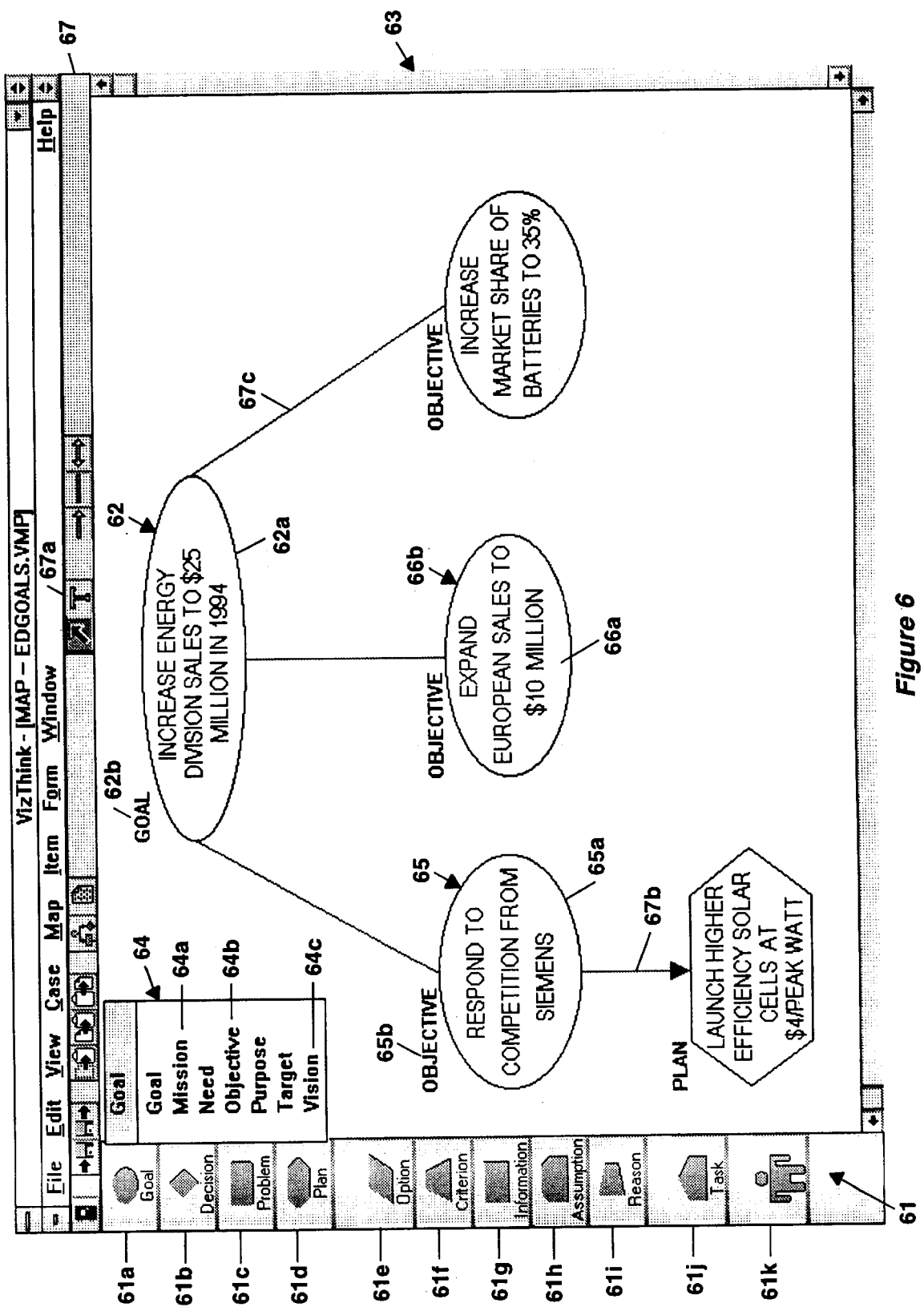
FIG. 6 is a screen shot illustrating a palette of elements with their symbols and main label, the indicia within one palette element, toolbar, menus, a map, items on a map, and links between the items, in one particular embodiment of the present invention.

FIG. 6 is a screen shot illustrating a palette of elements with their symbols and main label, the indicia within one palette element, toolbar, menus, a map, items on a map, and links between the items, in one particular embodiment of the present invention. The domain of application is purposeful activities such as goal-setting, problem-solving, decision-making, planning, and action-implementation in individual, group, and organizational settings.

Palette 61 shows elements 61a through 61k with symbols and main labels representing the following entities of interest from the application domain: Goal 61a, Decision 61b, Problem 61c, Plan 61d, Option 61e, Factor 61f, Information 61g, Assumption 61h, Reason 61i, Task 61j, and People 61k. The user can create an instance Goal item, such as 62, with symbol 62a and label 62b, by selecting the Goal element 61a from palette 61 and dragging and dropping its outline on the map 63 at the desired location. Sub-labels or type labels can be examined by selecting that element in the palette 61 and then clicking the right button of the computer pointing device, such as a mouse. This operation opens a menu 64 that shows sub-labels such as Mission 64a, Objective 64b, and Vision 64c for Goal element 61a. By selecting a type or sub-label from menu 64, the user can create an item such as 65 with the element symbol ellipse 65a of the Goal class, but with the sub-label Objective 65b.

A powerful visual language emerges from the use of elements with symbols and class and type labels and from their common, shared usage and meaning. Even if class or type labels are not attached to an element symbol, palette 61 with its display of the symbols and class labels allows users to identify the label of an item by matching the item symbol with the symbols on the palette and then noting the palette's class label.

Users enter descriptive text, such as 66a, into an item, such as 66b after selecting the text mode icon 67a on tool bar 67. Text from existing computer-based documents, or from lists or text documents, can be transferred to an item on a map by first selecting the desired text, then selecting the desired element on palette 61, and then placing the cursor on the map where the item is to be located. Items can be connected with lines or arrows of various kinds, such as 67b and 67c to show how they are related in terms of sequence, cause-effect relationship, the flow of issues and ideas, hierarchy, etc.

Figure 7:
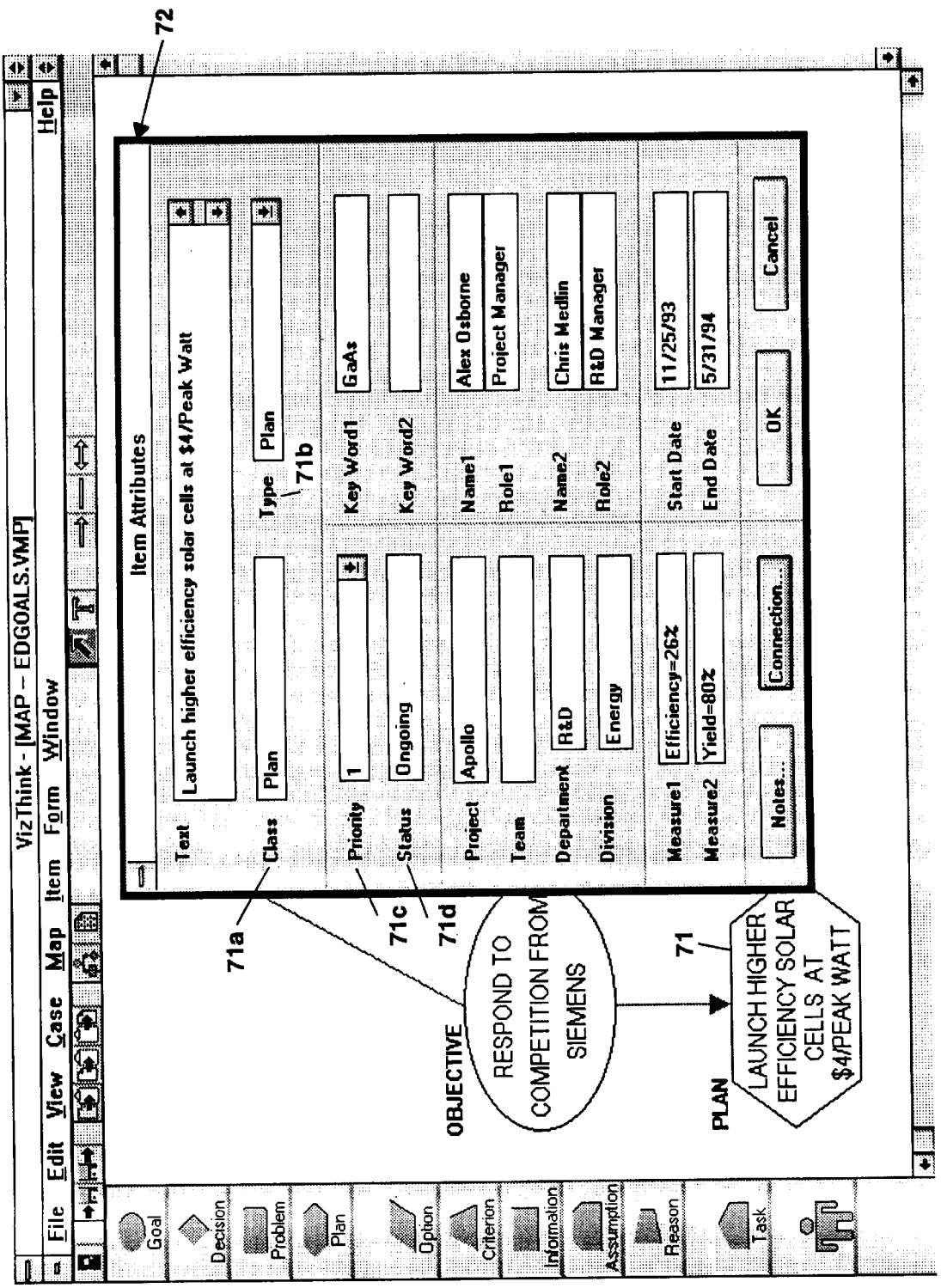
FIG. 7 is a screen shot illustrating a form for defining item attributes, in particular embodiment of the present invention.

An item such as Plan 71 in FIG. 7 can have data attributes such as Class 71a, Type 71b, Priority 71c, and Status 71d. Values for these attributes, such as 1 for Priority 71c, Ongoing for Status 71d can be entered in fields adjoining the attribute label in Item Attributes dialog box 72. Double clicking on an item on a map opens its attribute dialog box. The attributes of an item depend on the basic element category it belongs to. For example, a Goal item has attributes such as priority, dates related to its accomplishment, people responsible for it, key words, etc. Users can change attribute definition fields and screens to suit their needs. Notes and annotations can be added in a separate box belonging to each object. A visual cue, such as the letter N or a notepad icon will show up in the area around and close to an item to indicate that it has a non-blank Note attached to it. Double clicking on the cue will lead to the Note screen. Similarly, annotations are tagged and accessed through a visual cue or the letter A appearing in the region near the object.

Items on maps can be colored, shaded, highlighted, flashed, rendered static or dynamic, etc. in various ways and modes to draw attention to them, or to add visual information and significance based on their source, author, contents, links, attributes, status, and other properties. Further, areas or regions around an item can be made to hold fields that show specific information in a display mode. As an example, the user can have the priority code for each Goal show up in a specific field area adjacent to the item on a map. Information for such displays can be selected by the user and the display itself can be turned on or off at the user's discretion.

Users can attach items to each other with lines or arrows of various kinds, to form links. Links show the connections and relations between the issues, represented as items on a map, in a situation. Links can be of various kinds, for example: straight, curved, or at right angles. They can also be labeled to show additional detail, or to describe various kinds of connections and the relations between the linked objects.

Figure 8:
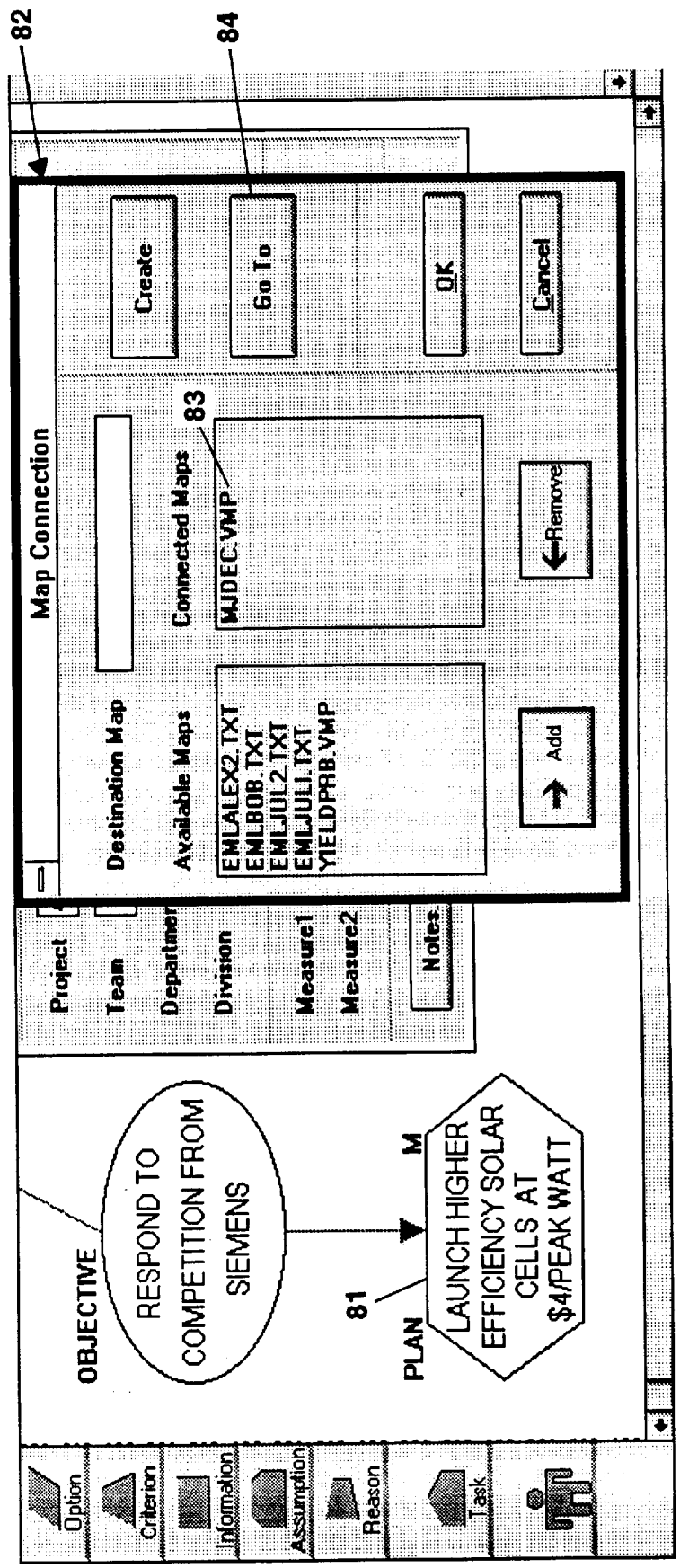
FIG. 8 is a screen shot illustrating the nested connection between an item on one map and another map, in one particular embodiment of the present invention.

The basic document in the present invention is a map, comprised of one or more items and the links between them. A connection can be established between any item and another map or other kind of document. Once a connection is defined, for example between an item and a map, a visual cue, such as the letter M or a map icon, will appear in the area around and close to that item. The connected map can be invoked via the visual cue. Maps can be organized in a nested hierarchy to show or hide levels of detail. FIG. 8 shows a Plan item 81 next to which the letter M appears to indicate that one or more maps are attached to it. Double clicking on the M would lead to Map Connection dialog box 82 which shows the name of a connected map 83. Selecting the connected map's name and selecting Go To button 84 would lead the user to the connected map on the display screen. A single map can be of arbitrary virtual size, constrained by memory and other system characteristics, that can be physically laid out on the computer screen as a grid of pages. Connectors can be attached to show continuity between items or maps on virtual pages that are physically together, but are printed on separate pages. Operations relating to maps are controlled by map module 216 (in FIG. 2) which is described in detail in FIG. 3.

Figure 9:
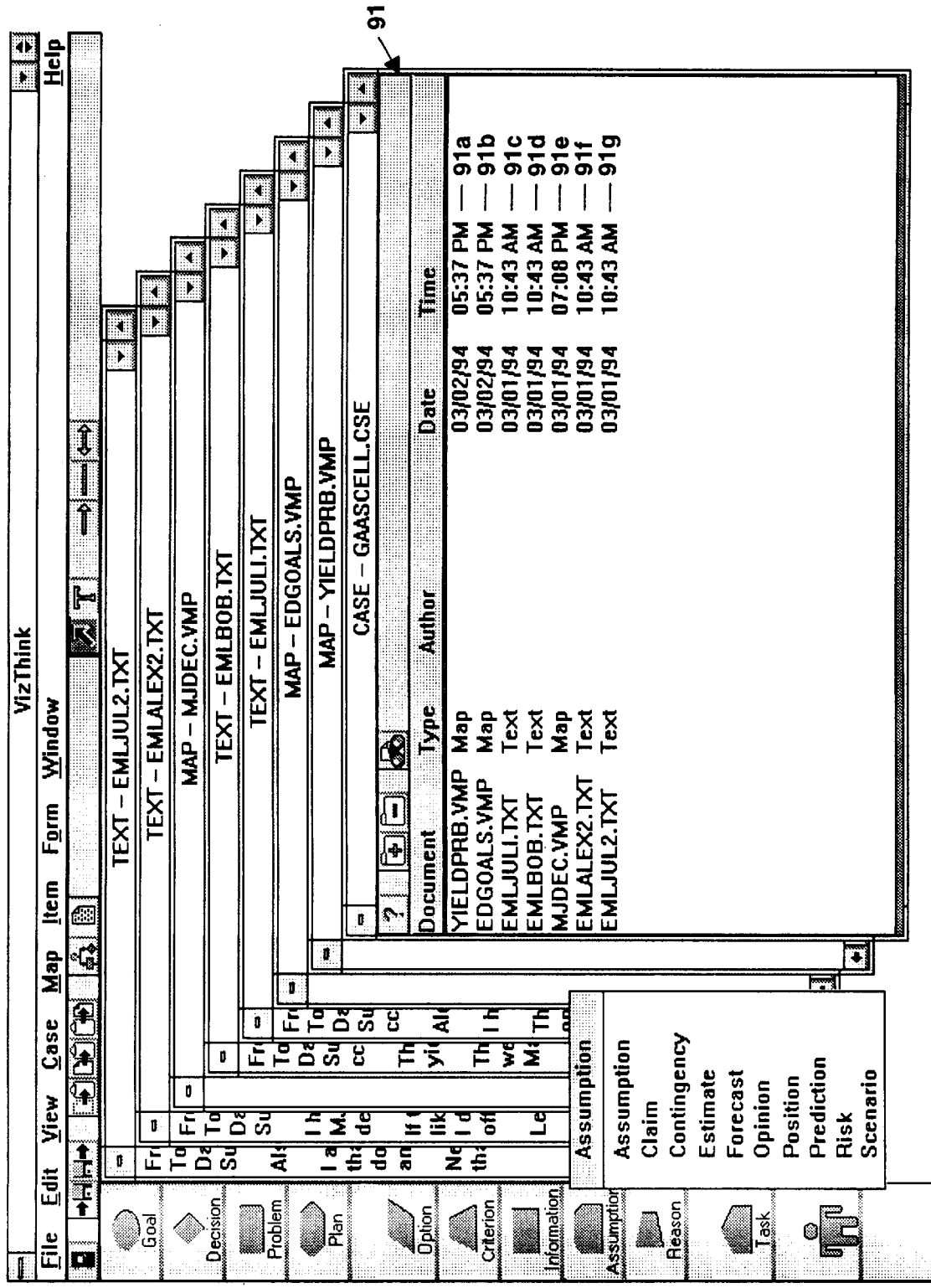
FIG. 9 is a screen shot illustrating a case folder showing references to maps and text documents, in one particular embodiment of the present invention.

A number of related maps, with or without connections between their component items can be indexed or referenced in a folder called a case. Other documents such as Lists, Grids, Templates, etc. can also be included in a case. A case can also contain documents from applications external to the present invention, such as spreadsheets and electronic mail message. Multimedia items such as audio/video clips and images, icons, pictures, and graphics can also be attached to maps and cases. A visual cue, such as the letter D or a suitable icon, would show the existence of attached documents and other objects, and double clicking on the cue would provide access to those attached objects. A case can be an arbitrarily large collection of documents and other objects from both within and external to the present invention. FIG. 9 shows a case folder 91 and the list 91a through 91g of text and map documents included by reference in it. Selecting and double clicking on any of these documents would lead the user to that document. Cases are managed by case module 214 (in FIG. 2) described in detail in FIG. 4.

Over a networked client/server or peer-to-peer computer environment, maps, cases, and other documents of the present invention may be shared in various ways among different users, depending on the level of access that is allowed to others by the authors or controllers of the documents. Different levels of access would include read-only, annotate, and edit access. People with annotate access would be able to attach their annotations to individual items or to maps or cases, depending on the kind of access they have. People given edit access can add, delete, or change the data or visual attributes of the relevant document or item. Access levels are defined, changed and controlled by access module 210 shown in FIG. 2.

The particular embodiment of the present invention described here allows users to parse maps and check them for completeness, consistency, and correctness. As one example: the dates of two attached items can be checked to make sure that the due date of an antecedent item does not fall before the due date of a precedent item. As another example: if a Problem map has a number of causes identified, and some of them do not have a Plan associated with them, the present invention will alert the user to the "orphan" Cause items by flashing them (or highlighting them in some other way) along with a message prompting the user to address those Causes by attaching Plans to deal with them. The user can override such alerts and have functional maps that are not "complete" or "correct". If most aspects of a problem are shown as deriving from one particular Cause, either directly or via other intermediate objects, that Cause will be highlighted to focus attention on it. Other such nodal objects can be tracked with similar heuristics that check for the centrality of an object, with the map being seen as a network. Numerical scores or weights can also be generated for various objects to analyze their impact, contribution, importance, criticality, etc. based on their data attributes or connections to or from other items on a map. "Alerts", highlights, and other focusing mechanisms can be triggered based on such scores, according to system or user defined thresholds and other benchmarks. Such operations are controlled by map analyzer module 208 shown in FIG. 2.

Tasks, Plans, and other items can be delegated or assigned by one user to others for various kinds of actions such as—Comment, Do, Annotate, Discuss, Reply, etc. Deadlines for such action can be specified. Once delegated or assigned over the network, they can be tagged and monitored to see if specified actions have been taken by the times defined. If no action has been taken and reported by the recipient, the system can put out an alarm to the dispatcher to alert him/her that a specific delegated item has not been acted on or responded to. If the recipient completes the action, he/she can mark off the item as Done, or attach other status notes, and send it back to the original dispatcher. A Status Update will then inform the sender of the status of the work that was originally sent out. Such tracking and monitoring and the triggering of alerts, reminders, or updates shall be an optional feature—the option to have them on or off shall be decided by users, depending on the organizational norms for such practices. At one extreme, objects and documents can be fully passive, i.e. no tagging, tracking, or updating will be possible. At the other extreme, automatic processes can be initiated to tag and track, remind or alert senders and receivers about status and other relevant variables, and provide status update reports periodically or on an "as needed" basis. These operations are managed by action module 204 shown in FIG. 2.

The present invention will allow users to send and receive e-mail messages in the form of memos. A memo may be attached to an item, map, case, or other documents, along with messages and check-boxes specifying what response or action is desired and by what date. Recipients are alerted about new memos when they log in or when a new memo is received by their computer system. They can reply to memos and send them back to the original sender, who can then respond to the reply. Such operations are managed by messaging module 206 shown in FIG. 2.

The present invention will connect with the users' day to day world by providing an internal to-do list manager and by interfacing with their external calendars, schedulers, to-do lists and other such planning, organizer, and action tools. The internal to-do list feature allows them to specify action items along with related start and end dates, priority, and status data. Such entries may be free-form, i.e. unattached to any item or map or other such entity of the present invention, or they could be attached to items, maps, memos or other such objects. Relevant data from memos, items, and other objects can be easily transferred to the to-do list to enable their implementation. A 'reminder' facility allows users to attach remind dates and times to to-do items, memos, and other objects. The system date and time is checked against such remind dates and times to generate appropriate reminder messages. Such operations are managed by action module 204 shown in FIG. 2.

Figure 5:
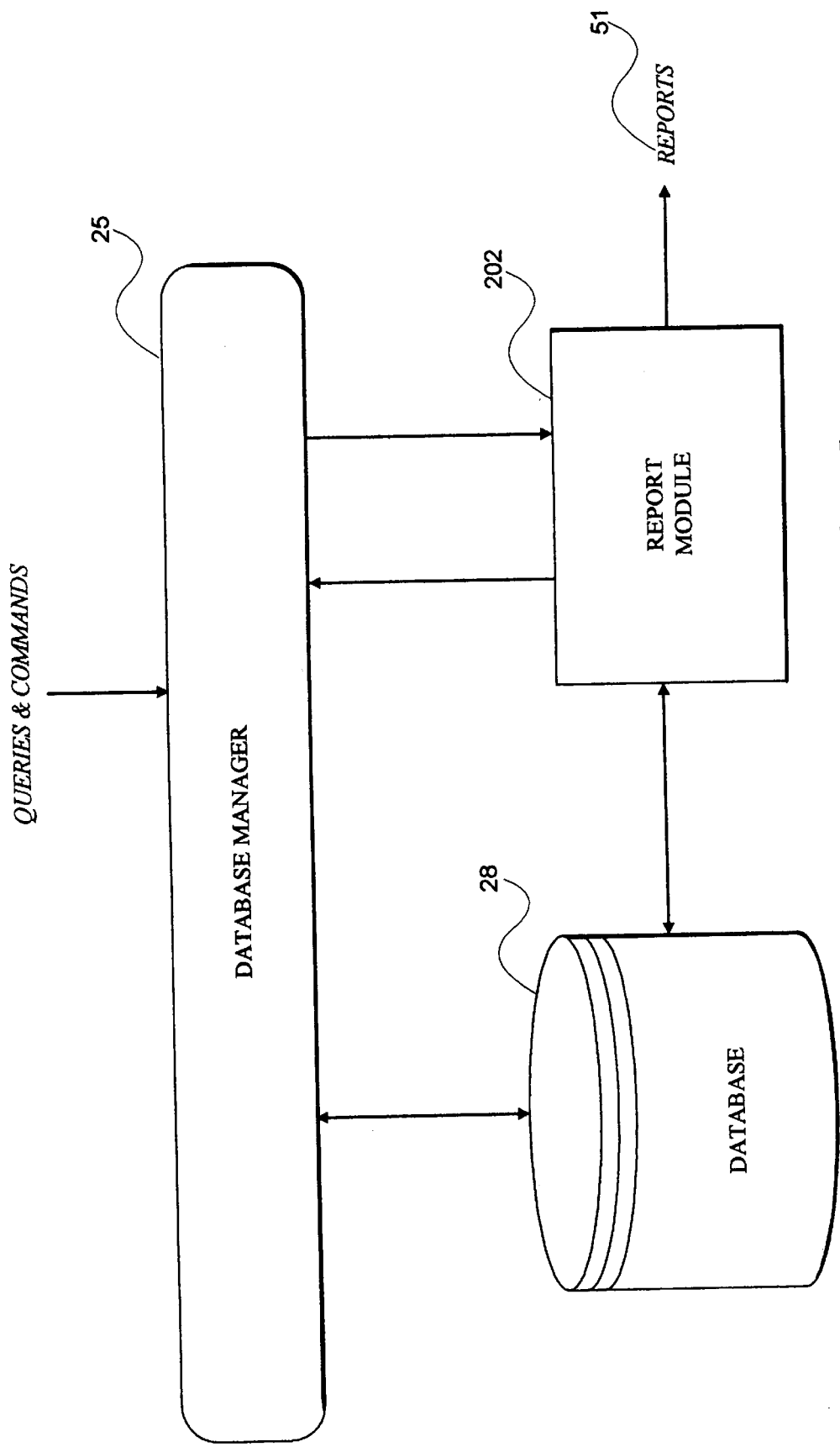
FIG. 5 is a block diagram of the database module in one particular embodiment of the present invention.

Reports can be generated by the present invention based on the attributes of items in maps and the attributes of links, maps, cases, and other documents as well. Reporting is accomplished by report module 202 (FIG. 5) which interfaces with database manager 25 to access data from database 28 to generate various reports 51.

People element 61$k$ in palette 61 (FIG. 6) allows the users to identify people involved with their project or other work related activities. For each employee, a detailed description—name, affiliation, roles, responsibilities, project identifiers, and other such information—can be entered in a Profile screen. People element 61$k$ will lead to a menu list of employees. Selecting a name and dragging will create a People item with that employee name as the identifying label. When a Task, Goal, or other object is dragged and dropped on top of a particular People item, that person gets assigned to implement or act on that object. The particular embodiment of the invention described here automatically pipes that object over the network to that person's environment and flags it for his/her attention and follow-up action.

The present invention will provide users with knowledge and guidelines about managerial processes such as: goal setting, strategy formulation, problem solving, decision making, implementing plans, communicating, coaching, negotiating, performance appraisal, etc. An on-line advisor will provide such 'just-in-time' training and guidance. A heuristic mode will track user's maps and process activities and trigger help screens or other interactions in a context-sensitive way driven by the process or objects that the user is engaged with and the structure or configuration of the document the user is working on. A hypertext searching, nesting, and linking capability will make process help, guidelines, examples, do's and don'ts, etc. available to the user at varying levels of detail.

Users will have access to specific modules that will attach to provide content knowledge in specific domains such as: R&D Management, New Product Development, Technology Transfer, Mergers and Acquisitions, Fostering Innovation, Strategic Planning, Budgeting, etc. Such domain-specific knowledge will help the user with the content and process of working in those areas.

A file transfer means to attach computer-based documents and other objects to maps and cases is part of the present invention, and it works as follows: 1). The user marks the place in a map or case, or other documents within or outside the present invention, at which he/she would like to attach other documents or objects. The selected destination place is marked with a visual cue, such as the end of a Hose. 2) The user navigates to the document or object that is to be attached (to the spot marked in step 1 above), and selects or highlights it. Then by invoking a suitable command, for example a Faucet command, the user can pipe or transfer the selected document or object to the document and spot marked with the Hose. Multiple Hose marks can also be made and selective Faucet commands invoked to direct transfers between multiple sources and destinations.

Although the description above contains many specific details, these should not be construed as limiting the scope of the invention but as merely providing illustrations of some of the present embodiments of this invention. Various other embodiments and ramifications are possible within its scope. Therefore the scope of the invention should be determined by the appended claims and their legal equivalents, rather than by the examples given.

We claim:

1. A computer implemented method for representing and processing conceptual and physical entities, comprising:

Creating an application in memory for representing conceptual and physical entities comprising the steps of:
a) providing a palette generation module allowing users to select one or more visual or other symbols to represent conceptual and physical entities in a domain of interest;
b) providing an attribute definition module allowing users to define indicia, attribute categories, and attribute values for said symbols to create a set of elements representing said domain of interest;
c) providing a database generator module to create data representations in computer memory of said elements;
d) providing an application generator module to create and display a plurality of instances of said elements and to assign values for their attribute categories on a computer-based document or other computer-based repository; and Using the application to create a user-specific application comprising the steps of:
e) selecting symbols from said palette generation module to represent entities in a domain of interest;
f) assigning indicia to said symbols with said attribute definition module, thereby creating a set of elements representing said domain of interest;
g) defining attribute categories to describe said elements, using said attribute definition module;
h) creating a plurality of instances of said elements, with their indicia displayed explicitly as needed, with the application generator module on a computer-based document or other repository;
i) defining attributes of said instances by assigning values to their attribute categories with the application generator module;
j) computing statistics and other parameters for said instances of said elements based on said attributes and on data attributes of other instances of said elements;
k) displaying said computer-based document to users with the application generator module.

2. The computer-implemented method of claim 1, further comprising linking said instances by connecting visual lines between said instances on said computer-based document thereby providing a visual representation of the relationships between said instances.

3. The computer-implemented method of claim 1, further comprising transmitting said computer-based document to a plurality of users over a computer network.

4. The computer-implemented method of claim 1, further comprising connecting additional computer-based documents and objects to said instances.

5. A computer-implemented method for creating a user-specific palette for use in creating computer-based documents, comprising:

Creating a user-specific palette, comprising the steps of:
a) selecting symbols from memory;
b) attaching indicia to the symbols to create elements;
c) defining attribute categories for the elements; and Using the user-specific palette to create a computer based document, comprising the steps of:
d) creating a plurality of instances of the elements, with their indicia displayed explicitly as needed, on a computer-based document,
e) defining attributes of said instances by assigning values to their attribute categories;
f) establishing links between said instances of the elements to define relationships between them;
g) computing statistics and other parameters for said instances of said elements based on said attributes and on data attributes of other instances of said elements to which they are linked.

6. The computer-implemented method of claim 5, further comprising analyzing said instances for consistency, correctness, and completeness with regard to predetermined normative rules regarding their indicia, attributes, and links between them.

7. The computer-implemented method of claim 5, with a palette of symbols and indicia representing the following conceptual entities: Goal, Decision, Plan, Problem, Action, People, Factor, Option, Assumption, Reason, and Information.

8. The computer-implemented method of claim 5, further comprising generating reports based on said attributes of said instances of said elements.

9. The computer-implemented method of claim 5, further comprising connecting additional computer-based documents, repositories, and other computer-based objects to said instances.

10. The computer-implemented method of claim 5 further comprising attaching and transmitting messages with said instances of said elements or with said computer-based documents or other repositories, over a computer network.

11. The computer-implemented method of claim 10, further comprising creating and updating lists of user-actionable items related to instances of said elements, said computer-based documents and repositories, or said messages.

12. The computer-implemented method of claim 5, further comprising creating and sharing annotations to said instances of said elements, and said computer-based documents and repositories, between users over a computer network.

13. The computer-implemented method of claim 5, further comprising assigning attributes to said links.

14. The computer-implemented method of claim 13, further comprising the step of highlighting said instances of said elements, and said links between them, on the basis of said attributes.

15. A system for creating computer-based repositories comprising:

a) a palette generation module allowing users to define one or more visual or other symbols to represent conceptual and physical entities in a domain of interest, b) an attribute definition module allowing users to define indicia and attribute categories for said symbols to create a set of elements representing said domain of interest, c) a database generator module to create data representations in computer memory of said elements, and d) an application generator to create a plurality of instances of said elements, to define attributes for them by assigning values for their attribute categories, to compute statistics and other parameters for said instances of said elements based on said attributes and on data attributes of other instances of said elements, and to display them on a computer-based document.

16. The system according to claim 15, further comprising means for transmitting said computer-based document to a plurality of users.

17. The system according to claim 15, further comprising means for providing links between said instances of said elements.

18. The system according to claim 17, further comprising means for assigning attributes to said instances of said elements or said links.

19. The system according to claim 18, further comprising means for analyzing said instances of said elements and said links between them for consistency, correctness, and completeness with regard to predetermined normative rules regarding their indicia, attributes, and the links between them.

* * * * *